(12) United States Patent
Ramesh et al.

(10) Patent No.: US 12,706,523 B2
(45) Date of Patent: Aug. 11, 2026

(54) ADAPTIVE GATE VOLTAGE ADJUSTMENT

(71) Applicant: Renesas Electronics America Inc., Milpitas, CA (US)

(72) Inventors: Rahul Ramesh, Cary, NC (US); Yen-Mo Chen, Morrisville, NC (US); Sungkeun Lim, Apex, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 303 days.

(21) Appl. No.: 18/545,019

(22) Filed: Dec. 19, 2023

(65) Prior Publication Data

US 2025/0202341 A1 Jun. 19, 2025

(51) Int. Cl.

| | |
|---|---|
| ***H02M 1/08*** | (2006.01) |
| ***H02M 1/00*** | (2006.01) |
| ***H02M 3/158*** | (2006.01) |

(52) U.S. Cl.

CPC .......... *H02M 1/08* (2013.01); *H02M 1/0009* (2021.05); *H02M 1/0045* (2021.05); *H02M 3/158* (2013.01)

(58) Field of Classification Search

CPC .... H02M 1/08; H02M 1/0009; H02M 1/0045; H02M 3/158; H02M 1/0048; H02M 3/07; H02M 3/1588; H02M 1/0054; H02M 1/088

See application file for complete search history.

(56) References Cited

U.S. PATENT DOCUMENTS

| | | | | |
|---|---|---|---|---|
| 7,550,954 B2 * | 6/2009 | De Nisi | .................. | H02M 1/10 307/45 |
| 2008/0001553 A1 * | 1/2008 | Qiu | .................... | H03K 17/0822 315/307 |
| 2024/0128858 A1 * | 4/2024 | Cheung | ............... | H02M 3/1586 |

* cited by examiner

*Primary Examiner* — Kyle J Moody

(74) *Attorney, Agent, or Firm* — SCULLY, SCOTT, MURPHY & PRESSER, P.C.

(57) ABSTRACT

Systems and methods for method for operating a switching converter are described. A controller can sense a load current associated with an output voltage of a power stage. The controller can, based on the sensed load current, define a gate voltage at one of a default voltage level and a modified voltage level. The gate voltage can be for driving the power stage.

15 Claims, 5 Drawing Sheets

ADAPTIVE GATE VOLTAGE ADJUSTMENT

BACKGROUND

The present disclosure relates in general to semiconductor devices. More specifically, the present disclosure relates to an adaptive gate voltage adjustment for power converters.

A voltage regulator or switching converter can convert an input voltage into an output voltage having a desired voltage level. The switching converter (e.g., 3-level buck converter), can include a controller, a pair of gate drivers, and a pair of switches that include a high-side switch and a low-side switch. The controller can provide control signals (e.g., pulse width modulation (PWM) or pulse-frequency modulation (PFM) signals) to a pair of gate drivers. The gate drivers can drive a high-side switch and a low side switch alternately according to the control signal. The alternate switching can convert the input voltage into the output voltage.

SUMMARY

In one embodiment, semiconductor device is generally described. The semiconductor device can include a circuit and a controller. The circuit can be configured to define a gate voltage for driving a power stage. The controller can be configured to sense a load current being outputted by the power stage. The controller can be further configured to, based on the sensed load current, control the circuit to define the gate voltage at one of a default voltage level and a modified voltage level.

In one embodiment, a system is generally described. The system can include a power stage configured to convert an input voltage into an output voltage. The system can further include a driver circuit configured to output a gate voltage to drive the power stage. The system can further include a controller configured to sense a load current associated with the output voltage. The controller can be further configured to, based on the sensed load current, define the gate voltage at one of a default voltage level and a modified voltage level.

In one embodiment, a method for operating a switching converter is generally described. The method can include sensing a load current associated with an output voltage of a power stage. The method can further include, based on the sensed load current, defining a gate voltage at one of a default voltage level and a modified voltage level. The gate voltage can be for driving the power stage.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
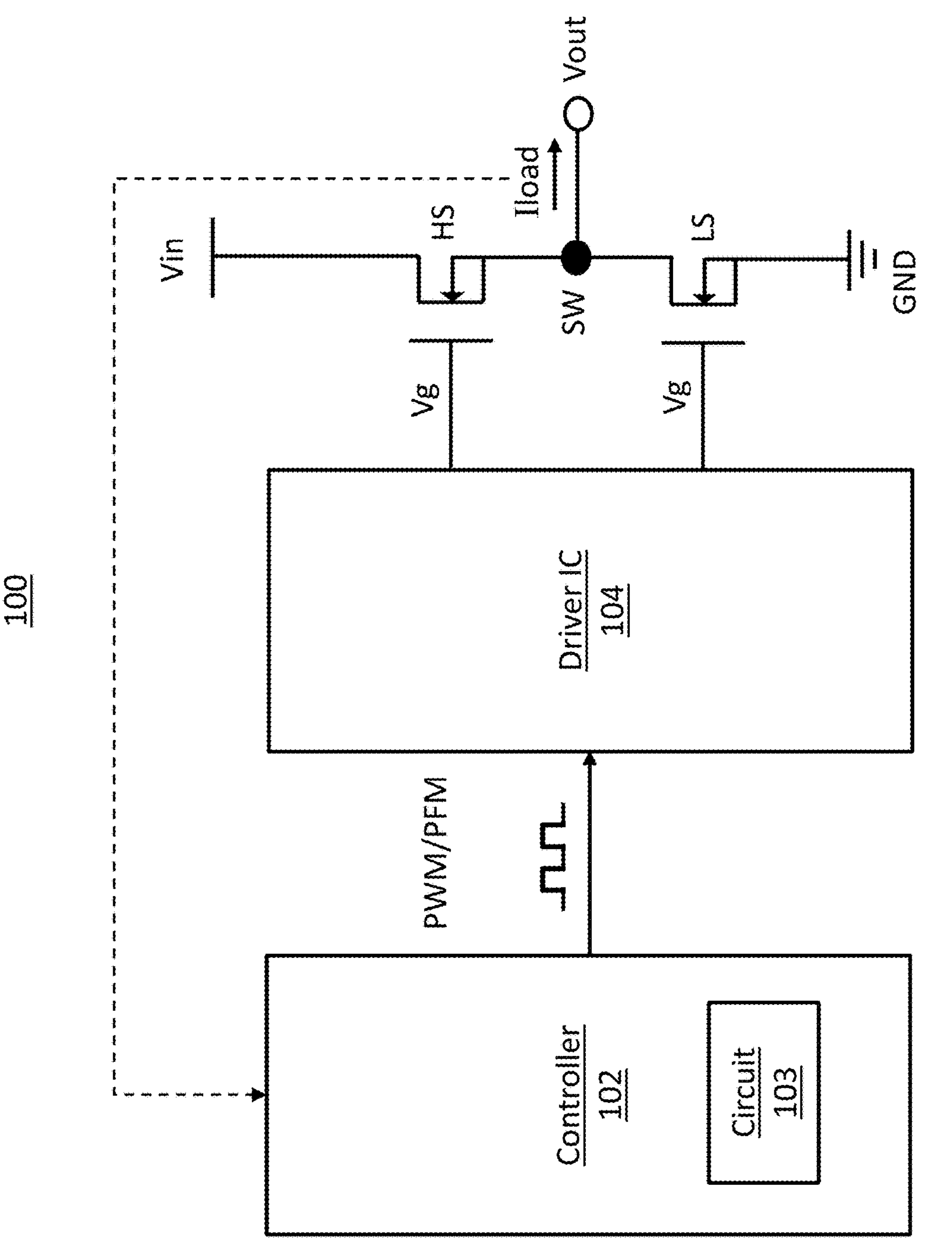
FIG. 1 is a diagram showing a system that can implement adaptive gate voltage adjustments in one embodiment.

FIG. 1 is a diagram showing a system that can implement adaptive gate voltage adjustments in one embodiment. A system 100 shown in FIG. 1 can be implemented by one or more semiconductor devices. System 100 can include at least a controller 102, a driver integrated circuit (IC) 104, a high-side switch labeled as HS and a low-side switch labeled as LS. Driver IC 104 can include a driver configured to drive HS and another driver configured to drive LS. Driver IC 104 can be configured to provide gate voltages Vg to drive switches HS and LS. Switch HS can be configured to be switched on while LS is switched off, and vice versa. When HS is switched on and LS is switched off, a voltage at a switch node SW between HS and LS can be pulled up to Vin such that the voltage at switch node SW is equivalent to Vin. When HS is switched off and LS is switched on, the voltage at switch node SW can be pulled down to ground, hence VSW is equivalent to zero. In one embodiment, HS and LS switches can be field-effect transistors (FETs) such as metal oxide semiconductor field effect transistors (MOSFETs). In other embodiments, HS and LS switches can be diodes or insulated-gate bipolar transistors (IGBTs).

Controller 102 can be, for example, a processor, microcontroller, central processing unit (CPU), field-programmable gate array (FPGA) or any other circuitry that is configured to control and operate battery circuit 101. While described as a CPU in illustrative embodiments, controller 102 is not limited to a CPU in these embodiments and may comprise any other circuitry that is configured to control and operate driver IC 104. Controller 102 can be configured to generate control signals, such as pulse width modulation (PWM) or pulse frequency modulation (PFM) signals for controlling driver IC 104 to selectively turn switches HS and LS on and off.

When performing switching operations, the efficiency of the power stage, comprising of a HS and LS switch, can vary depending on multiple characteristics. This can include FET conduction losses and switching losses. The FET conduction losses are related to the gate voltage such that as the gate voltage increases, the drain-source on-state resistance (Rds (on)) decreases. However, as the gate voltage increases, the total gate charge (Qg) increases which causes switching losses. Switching losses occur during the transition between the on-state and off-state of the FET. During this transition, the FET is not fully on or fully off, resulting in a period of high current and high voltage simultaneously. This produces significant power dissipation, which contributes to overall switching losses. In addition, the mode of operation for most power converters is typically Continuous Conduction Mode (CCM) or Discontinuous Conduction Mode (DCM). In CCM, the inductor current remains non-zero throughout the entire switching cycle, ensuring a continuous flow of energy. On the other hand, in DCM, the inductor current drops to zero before the beginning of the next switching cycle, creating a discontinuous flow of energy.

To be described in more detail below, controller 102 can be configured to change the voltage level of the gate voltage Vg at a specified time to increase the efficiency of system 100. In one embodiment, controller 102 can include a circuit 103 that can change gate voltage Vg depending on the load current A. Controller 102 can be configured to monitor load current Iload being drawn by a load receiving Vout and based on the load current Iload, enable or disable circuit 103 to change gate voltage Vg. In an aspect, a relationship between the efficiency of system 100 and load current Iload can depend on the gate voltage Vg. By way of example, a lower gate voltage can result in higher efficiency at lower load current, and a higher gate voltage can result in a higher efficiency at higher load current. Controller 102 can monitor load current Iload and determine whether operating switches HS and LS using a higher gate voltage or a lower gate voltage will optimize the efficiency of system 100.

Figure 2:
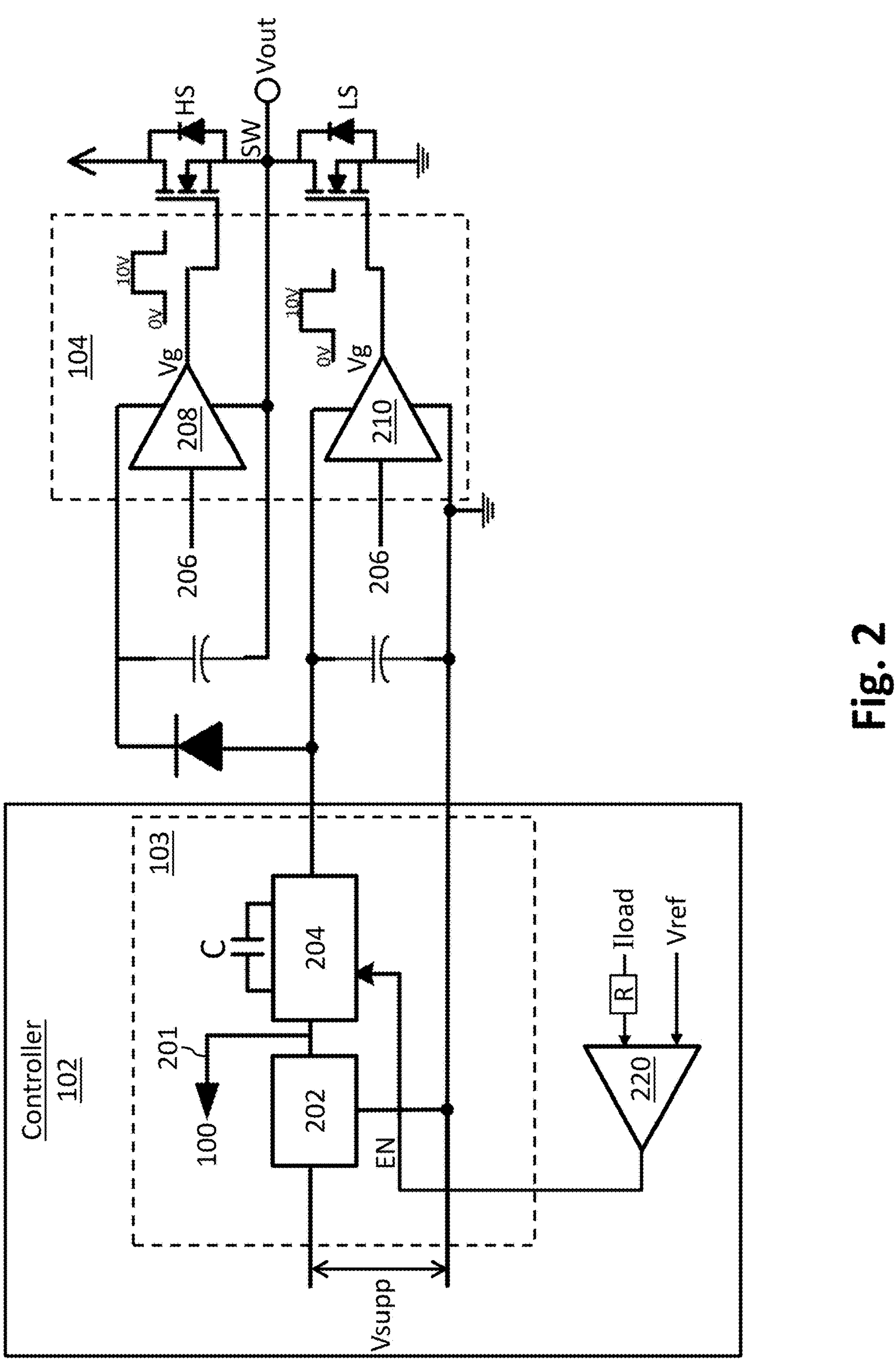
FIG. 2 is a diagram showing an example implementation of adaptive gate voltage adjustments in another embodiment.

FIG. 2 is a diagram showing an example implementation of adaptive gate voltage adjustments in another embodiment. Descriptions of FIG. 2 may reference components shown in FIG. 1. In an embodiment shown in FIG. 2, circuit 103 can comprise of a circuit 202 and circuit 204. Driver IC 104 can include a driver 208 and a driver 210. Driver 208 can be configured to drive the HS switches and driver 210 can be configured to drive the LS switches. Drivers 208, 210 can be configured to receive a control signal 206 to generate gate voltage Vg that drives the HS and LS switches. Control signal 206 can be, for example, a PWM or PFM signal generated by controller 102 as shown in FIG. 1.

Circuit 202 can be a low-dropout (LDO) regulator configured to generate a regulated voltage level even when an input voltage Vsupp varies in voltage level. In one embodiment, circuit 202 can include a combination of various electronic components that can be arranged into a circuit for generating a regulated voltage. In the embodiment shown in FIG. 2, circuit 202 can be implemented by an LDO that can generate a voltage signal 201 having a default voltage level. Voltage signal 201 having the default voltage level can be provided by circuit 202 to circuit 204 (if circuit 204 is enabled as shown in FIG. 2) and other components of the system 100. Circuit 204 can be connected to a capacitor C and configured to modify (e.g., increase or decrease) the voltage level of voltage signal 201. In one embodiment, circuit 204 can include a combination of various electronic components that can be arranged into a circuit for modifying the voltage level of voltage signal 201. In the example embodiment shown in FIG. 2, circuit 204 can be a voltage doubler circuit, such as a capacitive charge pump, and the default voltage level of voltage signal 201 is 5 volts (V). When circuit 204 is a voltage doubler, circuit 204 can increase, such as double, the default voltage level of voltage signal 201 from 5 V to 10 V. In another embodiment, the default voltage level can be, for example, 10V and circuit 204 can be configured to reduce or half the default voltage level of voltage signal 201 to a lower voltage, such as 5 V.

Further, circuit 204 can be configured to receive an enable signal, or a logic input, EN from controller 102. Circuit 204 can be enabled or disabled depending on a value of the enable signal EN. When enable signal EN indicates ON, circuit 204 can be enabled to modify the voltage signal 201 received from circuit 202. The modified voltage signal can be provided to drivers 208, 210 such that gate voltage Vg can be set to the modified voltage signal, and switches HS and LS can be driven using the modified voltage signal. In one embodiment, controller 102 can include components configured to monitor load current Iload and based on the monitoring, generate the enable signal EN to enable or disable circuit 204. In the example embodiment shown in FIG. 2, controller 102 can include a comparator 220 that can receive a voltage derived from the load current Iload through a resistor R, and a reference voltage Vref. The reference voltage Vref can be a predefined voltage that defines a condition to activate circuit 204. In one embodiment, if the default voltage level is 5V, in response to the voltage derived from load current Iload being equal to or greater than Vref, comparator 220 can output the enable signal EN to enable circuit 204 for modifying voltage signal 201 (or doubling from 5v to 10V).

Figure 3:
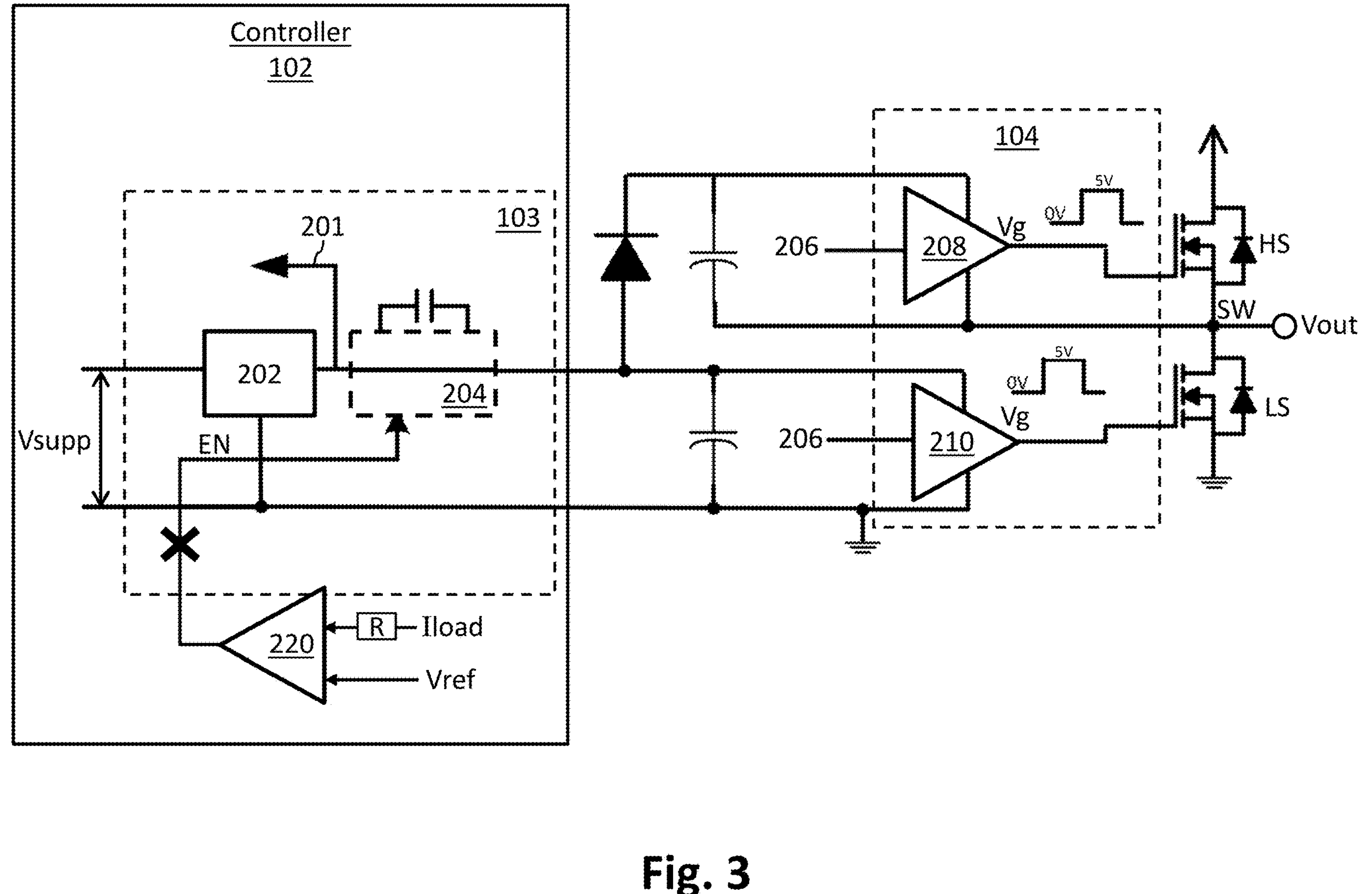
FIG. 3 is a diagram showing another example implementation of adaptive gate voltage adjustments in another embodiment.

FIG. 3 is a diagram showing another example implementation of adaptive gate voltage adjustments in another embodiment. Descriptions of FIG. 3 may reference components shown in FIG. 1 to FIG. 2. In an embodiment shown in FIG. 3, the enable signal EN indicates OFF, which causes circuit 204 to be disabled. When circuit 204 is disabled, the voltage signal 201 generated by circuit 202 can bypass the circuit 204, and the default voltage level (e.g., 5 V) can be provided to drivers 208, 210 such that gate voltage Vg can be set to the default voltage signal, and switches HS and LS can be driven using the default voltage level. In the embodiment shown in FIG. 3, if the default voltage level is 5V, in response to the voltage derived from load current Iload being less than Vref, comparator 220 can output the enable signal EN to disable circuit 204 to prevent modifications to voltage signal 201 and maintain Vg at the default voltage signal.

Figure 4:
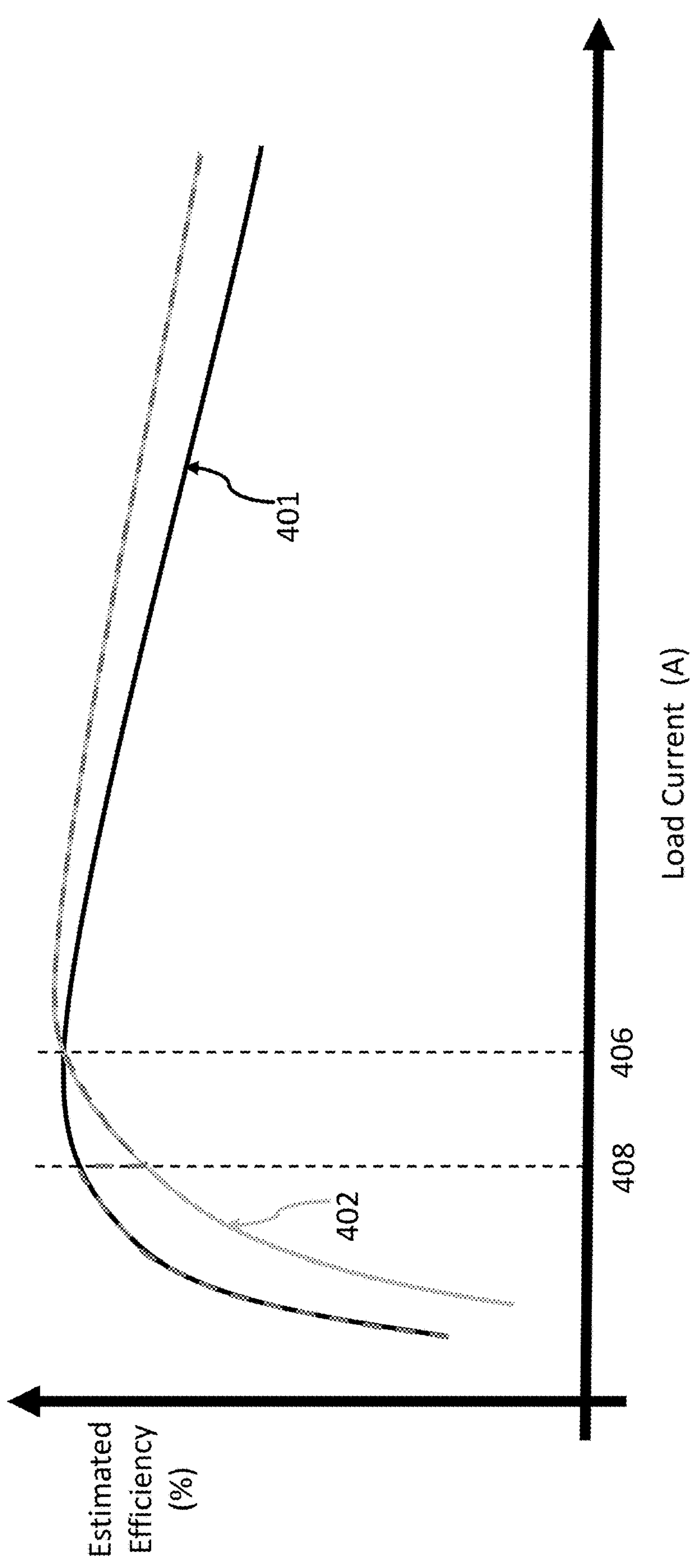
FIG. 4 is a diagram showing example parameters that can be used for implementation of adaptive gate voltage adjustments in one embodiment.

FIG. 4 is a diagram showing an example implementation of adaptive gate voltage adjustments. Descriptions of FIG. 4 may reference components shown in FIG. 1 to FIG. 3. The diagram in FIG. 4 depicts the relationship between estimated efficiency (expressed in percentage) and load current Iload (measured in Amperes). Curve 401 illustrates the relationship between the estimated efficiency and load current Iload when a 5 V gate voltage is applied to the driver IC 104. Curve 402 illustrates the relationship between the estimated efficiency and load current when a 10 V gate voltage is applied to the driver IC 104. Curve 401, corresponding to a 5 V gate voltage, demonstrates higher efficiency in low amp ranges, suggesting optimal performance under lower load currents. Conversely, curve 402, associated with a 10 V gate voltage, exhibits higher efficiency in high amp ranges, suggesting optimal performance under higher load currents. Thus, having controller 102 be configured to change the gate voltage Vg from 5 V to 10 V when the load current reaches a higher range to reduce FET conduction losses and switching losses, which improves efficiency. Controller 102 can also change the gate voltage Vg from 10 V to 5 V when the load current is at a lower range to reduce FET conduction losses and switching losses, which improves efficiency.

In one embodiment, to maximize the efficiency of the power stage, i.e., HS and LS switches and/or the overall system 100, controller 102 can be configured to enable or disable circuit 204 to modify gate voltage Vg at an optimal time. The optimal time can depend on various conditions, such as circuit parameters or the type of MOSFET used. The controller 102 can be programmed to enable circuit 204 to modify Vg at specific times, based on specific conditions, or by manual input. Furthermore, the controller 102 can be configured to enable or disable circuit 204 multiple times for a plurality of load current ranges. In one example embodiment, controller 102 can use a predefined load current 406 to set reference voltage Vref shown in FIG. 2 and FIG. 3. Predefined load current 406 can be a load current where curve 401 intersects with curve 402, or where the efficiency of the default gate voltage (e.g., curve 401 corresponding to 5V) starts to fall below the efficiency of the modified gate voltage (e.g., curve 401 corresponding to 10V). If the default voltage level is 5V, controller 102 can monitor Iload and in response to Iload being equal or greater than predefined load current 406, generate the enable signal EN to enable circuit 204 to increase Vg from the default voltage level of 5 V to 10 V. If the default voltage level is 10V, controller 102 can monitor Iload and in response to Iload being less than predefined load current 406, generate the enable signal EN to enable circuit 204 to decrease Vg from the default voltage level of 10 V to 5 V.

In another example embodiment, controller 102 can use another predefined load current 408 to set the reference voltage Vref. Predefined load current 408 can be dependent on a CCM-DCM boundary. The CCM-DCM boundary can be a condition where controller 102 transitions from a continuous operation, i.e, CCM to a discontinuous operation, i.e., DCM. In an aspect, controller 102 can be configured to switch operation modes based on a detection of the CCM-DCM boundary. Hence, using the predefined load current 408 that corresponds to CCM-DCM boundary can utilize existing functions and hardware of controller 102.

In an aspect, controller 102 can be configured to sense the load current at the voltage output Vout of the power stage, i.e., HS and LS switches. At low load current ranges, the controller 102 can be configured to operate in DCM. While in DCM, controller 102 can disable the doubler circuit 204 by sending an off signal at EN. Gate drivers 208 and 210 utilize the default voltage level (e.g., 5 V) gate drive to generate Vg for driving the HS and LS switches. When the load current reaches a higher range, and controller 102 transitions the operation mode to CCM, the controller 102 can enable the doubler circuit 204. Doubler circuit 204 can receive the 5 V from the circuit 202 and doubles the voltage to 10 V. The 10 V is received by the gate drivers 208 and 210 and a gate voltage Vg of 10 V can drive the HS and LS switches.

Figure 5:
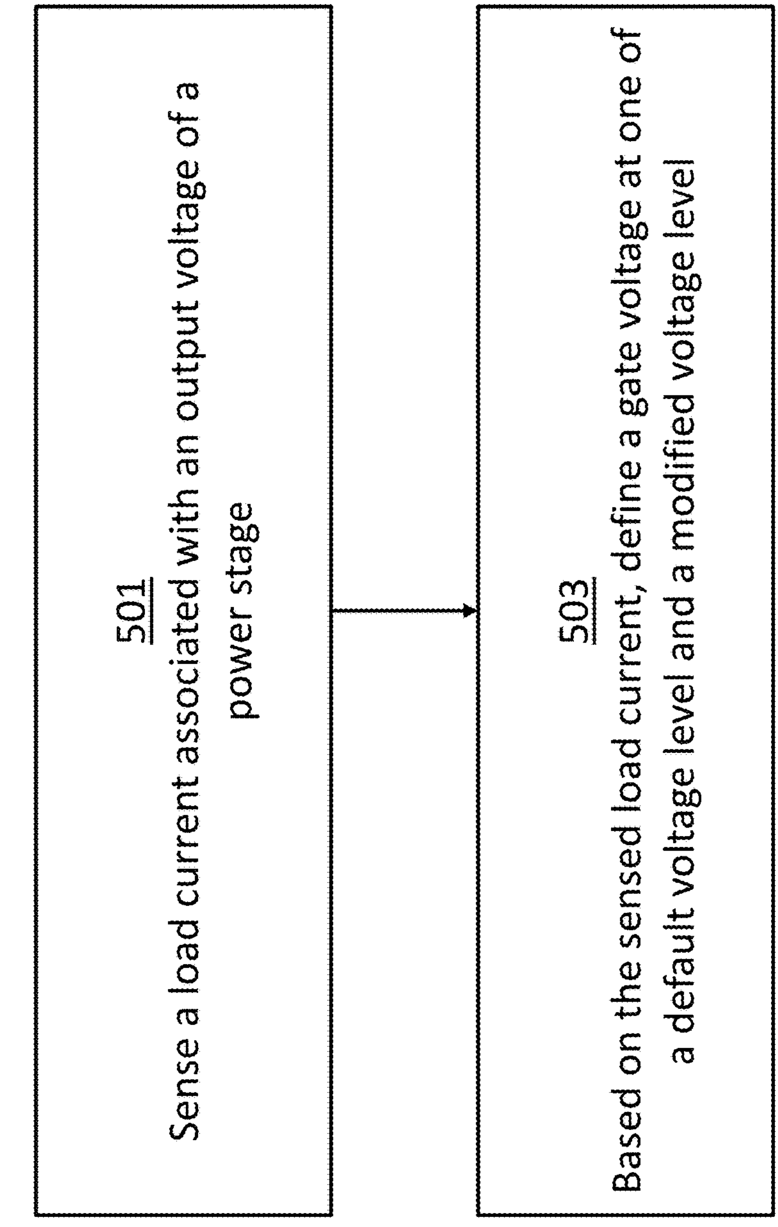
FIG. 5 illustrates a flow diagram of a process to implement adaptive gate voltage adjustments in one embodiment.

FIG. 5 illustrates a flow diagram of a process to implement dip injection for gate drivers in one embodiment. The process 500 can include one or more operations, actions, or functions as illustrated by one or more of blocks 501 and/or 503. Although illustrated as discrete blocks, various blocks may be divided into additional blocks, combined into fewer blocks, eliminated, performed in different order, or performed in parallel, depending on the desired implementation.

Process 500 can be performed by a controller, such as controller 102 described in the present disclosure. Process 500 can begin at block 501. At block 501, the controller can sense a load current associated with an output voltage of a power stage. Process 500 can proceed from block 501 to block 503. At block 503, the controller can, based on the sensed load current, define a gate voltage at one of a default voltage level and a modified voltage level. The gate voltage can be for driving the power stage.

In one embodiment, the default voltage level can be lower than the modified voltage level. The controller can determine the sensed load current is greater than a predefined load current. In response to determination that the sensed load current is greater than the predefined load current, the controller can increase the default voltage level to the modified voltage level.

In one embodiment, the controller can determine the sensed load current is less than a predefined load current. In response to determination that the sensed load current is less than the predefined load current, the controller can maintain the default voltage level.

In one embodiment, the controller can compare the sensed load current with a predefined load current that corresponds to a transition between a continuous conduction mode (CCM) and a discontinuous conduction mode (DCM) of the power stage. The controller can define the gate voltage based on a result of the comparison between the sensed load current with the predefined load current.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A semiconductor device comprising:

a circuit configured to define a gate voltage for driving a power stage; and a controller configured to:

sense a load current being outputted by the power stage;

compare the sensed load current with a predefined load current, wherein:

the predefined load current corresponds to an overlap between a first efficiency of the power stage associated with a default voltage level and a second efficiency of the power stage associated with a modified voltage level; or the predefined load current corresponds to a transition between a continuous conduction mode (CCM) and a discontinuous conduction mode (DCM) of the power stage; and based on the comparison between the sensed load current and the predefined load current, control the circuit to define the gate voltage at one of the default voltage level and the modified voltage level.

2. The semiconductor device of claim 1, wherein the default voltage level is lower than the modified voltage level.

3. The semiconductor device of claim 1, wherein the default voltage level is higher than the modified voltage level.

4. The semiconductor device of claim 1, wherein the default voltage level is lower than the modified voltage level, and the controller is configured to:

determine the sensed load current is greater than the predefined load current; and in response to determination that the sensed load current is greater than the predefined load current, enable the circuit to increase the gate voltage from the default voltage level to the modified voltage level.

5. The semiconductor device of claim 4, wherein the controller is configured to:

determine the sensed load current is less than the predefined load current when the circuit is enabled; and in response to the determination that the sensed load current is less than the predefined load current when the circuit is enabled, disable the circuit to prevent modification to the default voltage level.

6. The semiconductor device of claim 1, wherein the default voltage level is lower than the modified voltage level, and the circuit comprises:

a low-dropout (LDO) regulator configured to generate a voltage signal having the default voltage level; and a voltage doubler configured to modify the voltage signal by doubling the default voltage level.

7. A system comprising:

a power stage configured to convert an input voltage into an output voltage;

a driver circuit configured to output a gate voltage to drive the power stage; and a controller configured to:

sense a load current associated with the output voltage;

compare the sensed load current with a predefined load current, wherein:

the predefined load current corresponds to an overlap between a first efficiency of the power stage associated with a default voltage level and a second efficiency of the power stage associated with a modified voltage level; or the predefined load current corresponds to a transition between a continuous conduction mode (CCM) and a discontinuous conduction mode (DCM) of the power stage; and based on the comparison between the sensed load current and the predefined load current, define the gate voltage at one of the default voltage level and the modified voltage level.

8. The system of claim 7, wherein the default voltage level is lower than the modified voltage level.

9. The system of claim 7, wherein the default voltage level is higher than the modified voltage level.

10. The system of claim 7, wherein the default voltage level is lower than the modified voltage level, and the controller is configured to:

determine the sensed load current is greater than a predefined load current; and in response to determination that the sensed load current is greater than the predefined load current, increase the gate voltage from the default voltage level to the modified voltage level.

11. The system of claim 10, wherein the controller is configured to:

determine the sensed load current is less than the predefined load current when a circuit is enabled; and in response to determination that the sensed load current is less than the predefined load current when the circuit is enabled, disable the circuit to prevent modification to the default voltage level.

12. The system of claim 7, wherein the default voltage level is lower than the modified voltage level, and the controller further comprises:

a low-dropout (LDO) regulator configured to generate a voltage signal having the default voltage level; and a voltage doubler configured to modify the voltage signal by doubling the default voltage level.

13. A method for operating a switching converter, the method comprising:

sensing a load current associated with an output voltage of a power stage;

comparing the sensed load current with a predefined load current, wherein:

the predefined load current corresponds to an overlap between a first efficiency of the power stage associated with a default voltage level and a second efficiency of the power stage associated with a modified voltage level; or the predefined load current corresponds to a transition between a continuous conduction mode (CCM) and a discontinuous conduction mode (DCM) of the power stage; and based on the comparison between the sensed load current and the predefined load current, defining a gate voltage at one of the default voltage level and the modified voltage level, wherein the gate voltage is for driving the power stage.

14. The method of claim 13, wherein the default voltage level is lower than the modified voltage level, and the method further comprises:

determining the sensed load current is greater than a predefined load current; and in response to determination that the sensed load current is greater than the predefined load current, increasing the default voltage level to the modified voltage level.

15. The method of claim 13, further comprising:

determining the sensed load current is less than a predefined load current; and in response to determination that the sensed load current is less than the predefined load current, maintaining the default voltage level.

* * * * *